United States Patent Office 2,807,825
Patented Oct. 1, 1957

2,807,825

NOZZLE FOR SUCTION CLEANERS

Roland H. Gardner, North Canton, Ohio, assignor to The Hoover Company, North Canton, Ohio, a corporation of Ohio Application November 15, 1954, Serial No. 468,591

1 Claim. (Cl. 15—398)

The present invention relates to suction cleaners and more particularly to a suction nozzle designed to be attached to the end of a suction hose and designed especially for cleaning upholstery fabrics but also adapted for other uses.

A suction nozzle is usually, or may be, provided with front and rear nozzle lips lying in a surface contacting plane and with a brush or other litter picker located either exteriorly or interiorly of the nozzle mouth usually at the rear and projecting downwardly from the plane of the lips so as to engage the surface of the nap being cleaned to loosen hairs, lint or other litter so that it may be picked up by the air stream flowing across the nozzle lips.

According to the present invention the rear nozzle lip is replaced by a litter picker strip so that the strip forms the rear nozzle lip itself while retaining its litter picking ability.

The picker strip of the present invention is molded from flexible thermoplastic material in the form of a backing rib having a plurality of rows of comparatively long fingers extending from one edge thereof. The rib is secured to the body of the nozzle in any suitable manner so that the ends of the fingers extend downwardly to the plane of the lower face of the nozzle mouth to form the rear nozzle lip and to support the rear of the nozzle when the latter is in use.

The rows of fingers are staggered so that individual fingers overlap each other along the length of the nozzle and form a substantial seal for the rear of the nozzle mouth. The individual fingers may be flexed when used to flick up or loosen litter and permit the passage of air between the fingers so that the loosened litter may be drawn into the nozzle along with air being drawn past the nozzle lips.

A picker strip in addition to retaining its litter picking ability forms the entire rear nozzle lip including its nozzle supporting and sealing function.

The present invention is not limited to any particular number of rows of fingers so long as the fingers are staggered so as to overlap. According to the disclosure the fingers are two deep across the edge of the strip but are staggered so as to have the appearance of four rows. It is to be understood that the fingers could be one deep so long as the edges of the adjacent fingers overlap slightly.

Figure 2:
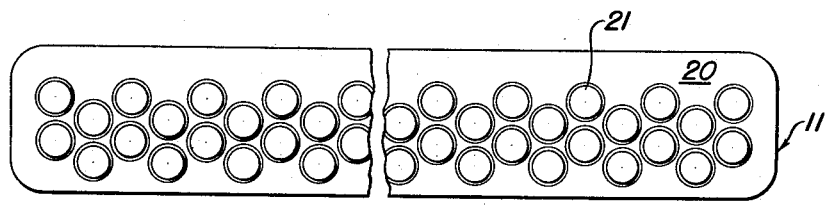
Figure 1:
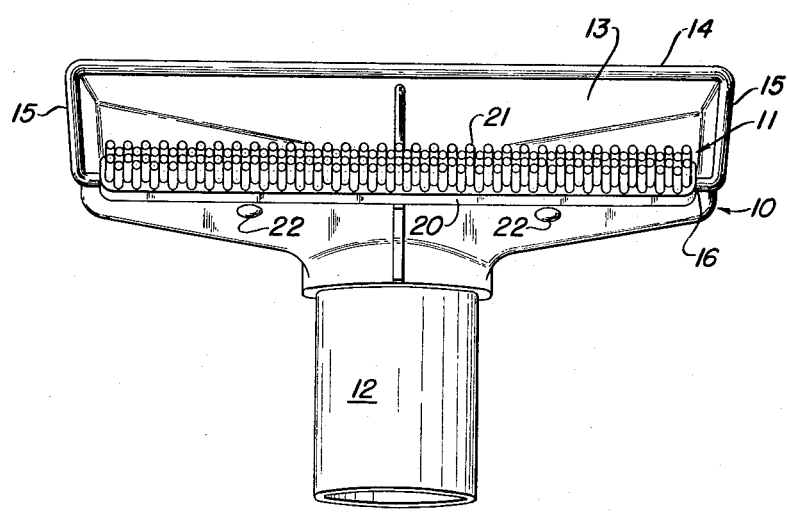

Other objects and advantages of the present invention will become apparent as the description proceeds when taken in connection with the accompanying drawings in which:

Fig. 1 is a bottom perspective view of the nozzle of the present invention showing how the litter picker strip is applied thereto and Fig. 2 is an enlarged bottom view of the litter picker strip of the present invention showing how the picking fingers are overlapped and staggered with relation to each other.

Referring to the drawings the reference numeral 10 generally represents the nozzle of the present invention and the reference numeral 11 generally represents the litter picker strip.

The nozzle includes a fitting 12 adapted to be attached to the suction hose of a suction cleaner and communicates with the mouth 13. The suction mouth 13 is formed by a front nozzle lip 14, end lips 15 and the picker strip 11 which forms the rear nozzle lip, the material of the nozzle mouth being cut away at 16 to provide a space into which the strip is inserted.

The picker strip 11 is molded from an elastic thermoplastic material and includes a backing rib 20 and a plurality of picking fingers 21 extending from one edge thereof. The fingers 21 are arranged two deep across the face of the strip but are staggered so as to have the appearance of forming four rows as shown in Fig. 2 with the individual fingers overlapping to some extent whereby the strip, as a whole, will form the rear nozzle lip while the individual fingers will retain their ability to flex and loosen lint, hairs and other litter which is drawn into the nozzle mouth 13 as the nozzle 10 is moved over a surface, for example, over the nap of upholstery, etc.

The fingers when unflexed will form a substantial seal at the rear of the nozzle but may be flexed to loosen litter and permit air to flow between individual fingers so that the litter will be readily drawn into the nozzle mouth 13 by air flowing across its surface contacting face.

The strip 11 may be attached to the rear wall of the suction mouth in any suitable manner such as by the rivets 22.

While the fingers 21 have been shown as two deep and having the appearance of forming four rows, it is to be understood that the only requirement is that the individual fingers overlap and yet remain capable of being flexed so as to retain their litter picking ability.

While I have shown and described but a single embodiment of my invention it is to be understood that that embodiment is to be taken as illustrative only and not in a limiting sense. I do not wish to be limited to the particular structure shown and described but wish to include all equivalent variations thereof except as limited by the scope of the claim.

I claim:

A suction nozzle including a body; said body being formed with a fitting adapted to be attached to a suction hose, with a downwardly facing suction mouth and with an air passage between said fitting and said mouth; said mouth including a front nozzle lip extending across the front of said body and with end lips extending rearwardly along the ends of said body from the ends of said front nozzle lip and extending downwardly to the plane of the lower edge of said front nozzle lip; said body being formed with a cut-away portion extending between the rear ends of said end nozzle lips; and a picker strip formed of flexible material extending across said cut-away portion between the rear ends of said end nozzle lips and forming the rear lip of said nozzle; said picker strip including a backing rib secured to said body above said cut-away portion and a plurality of downwardly extending closely arranged overlapping staggered fingers which extend downwardly to the plane of said front and end nozzle lips; said fingers being so closely arranged and said strip being so secured to said body that said strip forms a seal across the entire rear side of said nozzle and said fingers being sufficiently stiff to form the rear support for said nozzle yet sufficiently flexible to flex when said nozzle is moved across a surface to be cleaned to loosen dirt and litter from said surface.

References Cited in the file of this patent

UNITED STATES PATENTS

| | | |
|---|---|---|
| 2,275,357 | Gaines | Mar. 3, 1942 |
| 2,717,409 | Draudt | Sept. 13, 1955 |

FOREIGN PATENTS

| | | |
|---|---|---|
| 42,021 | Denmark | Apr. 14, 1930 |
| 487,883 | Great Britain | June 28, 1938 |
| 505,931 | Great Britain | May 19, 1939 |
| 668,835 | Germany | Dec. 10, 1938 |